Figure 1:
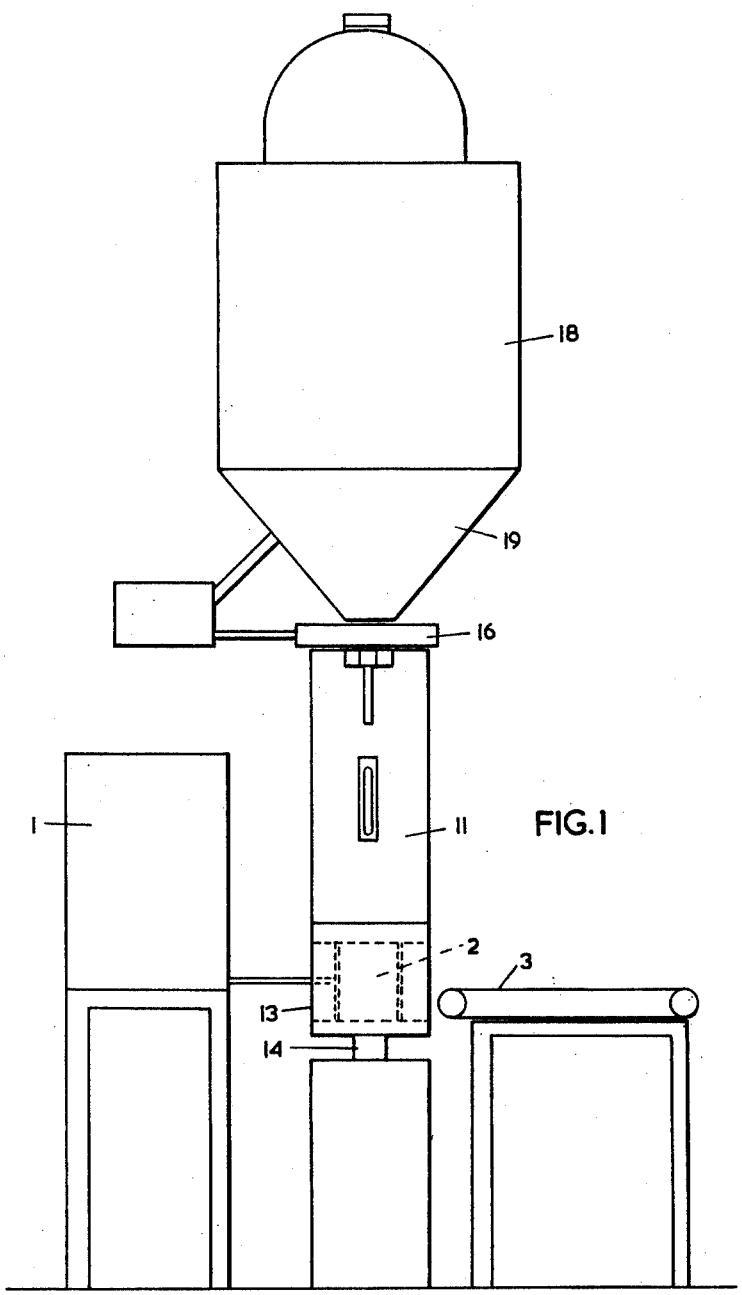

Oct. 13, 1964   B. K. BARBER   3,153,108
EXTRUSION PROCESS AND APPARATUS
Filed July 24, 1961   2 Sheets-Sheet 1

INVENTOR
Brian Kenneth Barber
BY
Aaron R. Townshend
ATTORNEY

INVENTOR
Brian Kenneth Barber
BY
Aaron R. Townshend
ATTORNEY

United States Patent Office 3,153,108
Patented Oct. 13, 1964

3,153,108
EXTRUSION PROCESS AND APPARATUS
Brian K. Barber, Wombourn, near Wolverhampton, England, assignor to The British Oxygen Company Limited, a British company
Filed July 24, 1961, Ser. No. 126,075
4 Claims. (Cl. 264—176)

This invention relates to an extrusion process and apparatus in which paste material in a container is extruded through a die by means of an extrusion ram. In one particular application of the invention the paste material is flux for flux-coated welding electrodes which is extruded through the die onto the core wire of such an electrode. The welding performance of flux-coated welding electrodes is very sensitive to the uniformity of the flux coating, and even a small gap or defect in the coating may result in a corresponding unsatisfactory length of weld seam due to the incidence of porosity or various other faults connected with inadequate flux coatings. In the manufacture of flux-coated welding electrodes, which are often produced in continuous lengths at high speed by automatic methods, it is therefore desirable to obtain uniform extrusion of flux at high extrusion rates of the order of one gallon per minute. A common cause of small gaps or defects in electrode coatings is attributable to the presence of voids or entrapped air in the pasty fluxing material before extrusion, and it is the purpose of the present invention to alleviate this problem and to provide an improved process and apparatus for the extrusion of paste material.

According to the present invention, in a process in which compressed paste material is extruded at an extrusion station from a cylinder, the cylinder is loosely loaded with paste material which is compacted and compressed, preferably to fill the cylinder, while the cylinder is at a loading station, and before the cylinder is moved to the extrusion station.

According to another aspect of the present invention, a process of extruding paste material from a cylinder comprises the steps of delivering the paste material into the cylinder from one end, inserting a tamping ram into this end of the cylinder, closing the other end of the cylinder with a pressure ram and a coaxial cylinder extension, operating the tamping ram to compact the paste material within the cylinder and cylinder extension, withdrawing the tamping ram, tightly closing the said end of the cylinder by closure means, and operating the pressure ram in the cylinder extension, which together close the said other end of the cylinder, to compress the paste material into a homogeneous slug substantially free of entrapped air and substantially filling the cylinder, removing the closure means, transferring the cylinder to an extrusion station where its ends are constituted by an extrusion ram and an extruding die, and operating the extrusion ram to force the paste material through the die.

According to the invention, in extrusion apparatus of the kind in which paste material in a compressed state in a container located in an extrusion station is arranged to be extruded through a die at one end of the container by an extrusion ram acting at the other end of the container, at least two similar containers are used, these containers being mounted on a support member which is arranged to rotate to locate the containers successively in loading and extrusion stations, and means are provided for supplying uncompressed paste material to a container in the loading station and a pressure ram is arranged to compress paste material in each container into a homogeneous slug substantially free of entrapped air before this container is moved to the extrusion station.

Where two similar containers are used the support member may be arranged to rotate through 180° to locate the containers successively in loading and extrusion stations.

The containers will usually be cylindrical, and a cylinder extension having substantially the same internal diameter as the containers may be arranged to abut one end of and be coaxial with a container in the loading station, the other end of the cylinder extension being closed by a pressure ram, and the other end of the container being arranged to be closed by closure means, and the pressure ram may be arranged to move into the cylinder extension to compress paste material in the container and cylinder extension into the cylinder alone.

A chute or channel may be arranged to supply paste material to the said other end of the container when this end is not closed by the closure means, and a tamping ram may be arranged to operate on this paste material in the container.

Figure 2:
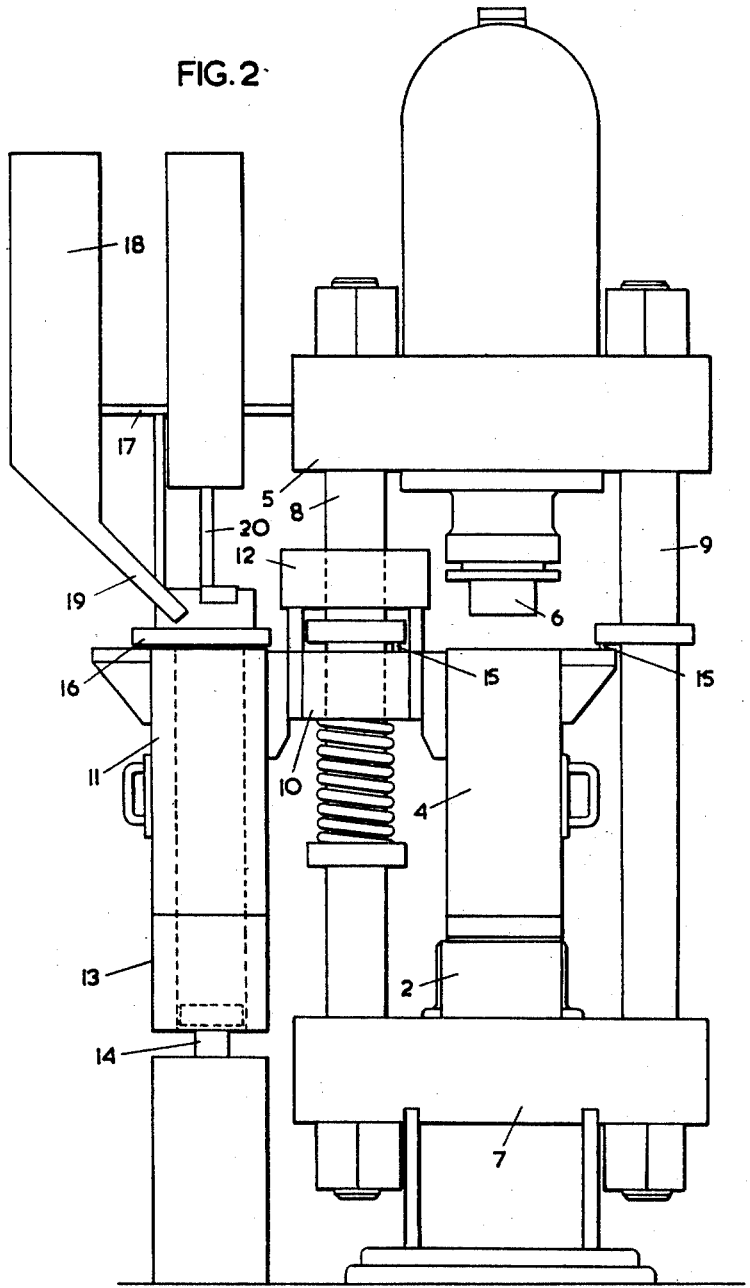

A particular apparatus which embodies the invention and which is used for the manufacture of flux-coated electric arc welding electrodes will now be described by way of example with reference to the two figures of the accompanying drawings in which FIGURES 1 and 2 are respectively front and side elevations of an electrode coating unit.

Referring to FIGURE 1, short lengths of core wire are delivered in known manner from a wire feeder 1 through the die block 2 of an extrusion machine and the coated electrodes then pass onto a belt conveyor 3. For clarity, the wire feeder 1 and belt conveyor 3 have been omitted from FIGURE 2. In FIGURE 2 can be seen a cylinder 4 from which flux material is forced into the die block 2 by an extrusion ram 6 in known manner.

The die block 2 is mounted on a base 7, and two upstanding pillars 8 and 9 and a joining member 5 constituting the main frame of the machine extend vertically from base 7 to support the vertically downward acting extrusion ram 6. This extrusion ram may conveniently be hydraulically operated and able to exert an extruding pressure of from 9,000 to 12,000 pounds per square inch.

A support member consisting of a horizontally disposed arm 10 is mounted on pillar 8 so that it can be rotated about the axis of this pillar by a rotating device 12 such as a hydraulic rotary actuator. The cylinder 4 is attached at one side of arm 10, and a similar cylinder 11, see FIGURE 2, is attached to the other side of this arm, the axes of the two cylinders being vertical. Rotation of the arm 10 through 180° brings the second cylinder into the station previously occupied by the first. Location of the arm 10 in its operative positions may be facilitated by locating means such as pins 15 which are mounted on the pillars 8 and 9 and arranged to project into sockets in the arm 10 when this arm is correctly positioned. The cylinder 4 is shown in the extrusion station between the pillars 8 and 9 where its lower end is closed by the die block 2 and its upper end may be closed by the extrusion ram 6. The other cylinder 11 is located in the loading station. A stationary cylinder extension 13, having the same inside diameter and conveniently the same outside diameter as the cylinders 4 and 11 is provided at the loading station, and this cylinder extension is coaxial with, and abuts the lower end of, the cylinder 11 in the loading station. The lower end of the cylinder extension 13 is closed by a pressure ram 14 which can reciprocate in this cylinder extension. At the upper limit of its stroke the pressure ram 14 reaches the lower end of the cylinder 11. This pressure ram may be hydraulically operated and adapted to exert pressures of approximately 2,000 pounds per square inch.

The upper end of the cylinder 11 in the loading station may be closed by closure means consisting of a horizontally sliding gate 16, which may be automatically and firmly fastened in the closed position by clamps while the pressure ram 14 is operated. A bracket 17 attached to the main frame of the machine carries a hopper 18 containing pasty fluxing material, and a chute or channel 19 leading from this hopper terminates just above the upper end of the cylinder 11.

A second bracket attached to the upper part of the main frame of the machine carries a tamping ram 20 which is located vertically above the cylinder 11, and may be operated to reciprocate vertically within this cylinder to tamp down flux material during filling of this cylinder by the hopper 18. Ram 20 may be hydraulically or pneumatically operated and adapted to exert a pressure of the order of 100 to 1000 pounds per square inch. It may also be made to rotate, and a tamping ram of reduced operating area can then be made to traverse the full area of the cylinder 11.

The operation of this apparatus to extrude flux material continuously onto a wire to form a flux-coated electrode is as follows. Starting from the condition in which cylinder 11 is empty in the loading station and cylinder 4 is full in the extruding station, and considering first the loading operation, the pressure ram 14 is withdrawn to the lower end of the cylinder extension 13, the sliding gate 16 is opened and pasty flux material is supplied from the hopper 18 to fill the cylinder extension 13 and the cylinder 11. The tamping ram 20 is operated to compact the flux. When the cylinder 11 is full of loosely compacted flux, the tamping ram 20 is withdrawn and the sliding gate 16 is closed and clamped in position. The pressure ram 14 is then raised to compress the flux material into a slug which exactly fills the cylinder 11 and is substantially free of entrapped air.

The volume of the cylinder and of the cylinder extension 13 and the stroke of the pressure ram 14 are such that the ratio of the volumes of compacted flux to compressed flux is approximately 3:2. The stroke of the pressure ram may be adjustable to give a different ratio if required. As the cylinder 11 is being loaded the extrusion ram 6 moves downwardly in the cylinder 4 to force flux material through the die block 2 and around the core wires which may be passing through the die at up to 1,500 feet per minute. The loading operation is timed to take no longer than the extrusion operation, and when the extrusion ram 6 has been withdrawn from the cylinder 4 the arm 10 is rotated to locate the filled cylinder 4 in the extrusion station and the empty cylinder 11 in the loading station.

Automatic control of the various hydraulic rams and of the rotation of the arm 10 is provided so that the operations follow automatically in sequence. Using cylinders approximately 6 inches in diameter and 15 inches long and an extrusion rate of 1 gallon of flux per minute there is roughly 1½ minutes available to fill the cylinder in the loading station, and the operations are controlled so that the reloading cycle is completed in this time. The non-productive time of the apparatus can be reduced to only ¼ minute per cycle.

The process and apparatus of the present invention may be modified so that more than two cylinders are employed. For example, the rotatable arm 10 may be replaced by a spider having 3 limbs at 120° to each other which is rotatable about its central hub, and each of these limbs may carry a cylinder. Thus while one cylinder is in the extrusion station the second may be at a filling and tamping station and the third may be at a station where the pressure ram compresses the compacted flux into a slug, the last two stations together constituting a loading station. The spider is rotated through 120° whenever the contents of a cylinder in the extrusion station have been ejected by the extrusion ram.

It will be seen from the foregoing description that the present invention provides a process and apparatus suitable for extruding flux at a high rate onto a core wire travelling at relatively high speed, in which comparatively little time is lost due to reloading of the extrusion cylinder. Another important advantage is that the presence of defects in flux coatings due to air entrapment in the flux before extrusion is largely eliminated by forming the slug of flux by compression in the cylinder from which it is to be extruded. Furthermore, no handling of separate slugs of flux is required and drying out of the flux is therefore largely eliminated.

I claim:

1. A process of extruding paste material from a cylinder comprises the steps of delivering the paste material into the cylinder from one end, inserting a tamping ram into this end of the cylinder, closing the other end of the cylinder with a pressure ram and a coaxial cylinder extension, operating the tamping ram to compact the paste material within the cylinder and cylinder extension, withdrawing the tamping ram, tightly closing the said end of the cylinder by closure means, and operating the pressure ram in the cylinder extension, which together close the said other end of the cylinder, to compress the paste material into a homogeneous slug substantially free of entrapped air and substantially filling the cylinder, removing the closure means, transferring the cylinder to an extrusion station where its ends are constituted by an extrusion ram and an extruding die, and operating the extrusion ram to force the paste material through the die.

2. In extrusion apparatus of the kind having an extrusion ram movable in an extrusion cylinder to eject paste material through a die at one end of the cylinder the improvement which consists in having at least two extrusion cylinders, a support member for the two extrusion cylinders, a rotary mounting for the support member whereby the extrusion cylinders may be moved successively into loading and extrusion stations, means for loading the extrusion cylinder in the loading station with uncompacted paste material, and means for compressing the paste material in the extrusion cylinder in the loading station into a compacted slug.

3. Extrusion apparatus as claimed in claim 2, and also comprising a cylinder extension having substantially the same internal diameter as the said cylinder, which is arranged to abut one end of the said cylinder in the loading station, the means for compressing the paste material into a compacted slug comprising a pressure ram arranged to close the other end of the said cylinder extension, and closure means for the end of the said cylinder remote from the said cylinder extension.

4. In an extrusion process in which paste material is extruded through a die from a cylinder containing a compacted slug of paste material, the steps of loading the cylinder with uncompacted paste material at a loading station, compressing the paste material into a compacted slug in the cylinder, and subsequently moving the cylinder to an extrusion station where the paste material in the cylinder may be extruded through the die.

References Cited in the file of this patent

UNITED STATES PATENTS

| | | |
|---|---|---|
| 767,872 | Davies | Aug. 16, 1904 |
| 1,924,474 | Wiegand et al. | Aug. 29, 1933 |
| 1,979,156 | Hettel | Oct. 30, 1934 |
| 2,080,783 | Petersen | May 18, 1937 |
| 2,514,486 | Green | July 11, 1950 |